United States Patent
Johnson (10) Patent No.: US 8,421,407 B2
(45) Date of Patent: *Apr. 16, 2013

(54) INDUCTIVELY COUPLED WORK SURFACES

(75) Inventor: LeRoy Johnson, Lowell, MI (US)

(73) Assignee: L & P Property Management Company, South Gate, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/391,698

(22) Filed: Feb. 24, 2009

(65) Prior Publication Data

US 2009/0212638 A1 Aug. 27, 2009

Related U.S. Application Data

(60) Provisional application No. 61/031,132, filed on Feb. 25, 2008, provisional application No. 61/142,557, filed on Jan. 5, 2009.

(51) Int. Cl.
*H02J 7/00* (2006.01)
(52) U.S. Cl.
USPC ............... 320/108; 108/65; 108/66; 108/69; 108/77; 108/82; 296/26.1
(58) Field of Classification Search ............... 320/108; 108/65–66, 69, 77–82
See application file for complete search history.

(56) References Cited

U.S. PATENT DOCUMENTS

| | | | |
|---|---|---|---|
| 2,861,855 A * | 11/1958 | Leshner | 108/36 |
| 4,210,859 A | 7/1980 | Meretsky | |
| 4,301,494 A | 11/1981 | Jordan | |
| 4,379,988 A * | 4/1983 | Mattatall | 320/108 |
| 4,591,777 A | 5/1986 | McCarty | |
| 4,647,831 A | 3/1987 | O'Malley | |
| 4,672,292 A | 6/1987 | Hernandez | |
| 4,739,242 A | 4/1988 | McCarty | |
| 5,266,881 A | 11/1993 | Hoffman | |
| 5,329,979 A * | 7/1994 | Miller et al. | 144/329 |
| 5,536,979 A | 7/1996 | McEachern et al. | |
| 5,686,809 A | 11/1997 | Kimura et al. | |

(Continued)

FOREIGN PATENT DOCUMENTS

| | | |
|---|---|---|
| WO | 2004038888 A2 | 5/2004 |
| WO | 2005086313 | 9/2005 |
| WO | 2009047768 A2 | 4/2009 |
| WO | 2009/108959 | 9/2009 |

OTHER PUBLICATIONS

Wo 200403888 A2 Cheng et. al. May 6, 2004.*

(Continued)

*Primary Examiner* — Samuel Berhanu
(74) *Attorney, Agent, or Firm* — Shook Hardy & Bacon LLP (57) ABSTRACT

Inductively coupled work surfaces with integrated primary coils are provided. Power is inductively coupled from a work surface with an integrated primary coil to a handheld device containing a secondary coil. The inductively coupled work surface may be a home work surface, an ergonomic industrial work bench, a work surface installed in the interior of a vehicle, or a collapsible work surface accessible from the exterior of a vehicle. Primary coils integrated into a work surface may provide varying amounts of power. Devices containing secondary coils, such as laptop computers, PDAs, cell phones, and power tools, are charged when placed on the work surface where primary coils are integrated.

17 Claims, 8 Drawing Sheets

U.S. PATENT DOCUMENTS

| | | | |
|---|---|---|---|
| 5,730,066 A * | 3/1998 | Auten et al. | 108/44 |
| 5,736,837 A | 4/1998 | Noda | |
| 5,959,433 A * | 9/1999 | Rohde | 320/108 |
| 5,963,014 A | 10/1999 | Chen | |
| 6,041,722 A * | 3/2000 | Baker | 108/77 |
| 6,055,911 A * | 5/2000 | Krenzer | 108/44 |
| 6,104,162 A | 8/2000 | Sainsbury | |
| 6,162,071 A | 12/2000 | Muller | |
| 6,204,744 B1 | 3/2001 | Shafer et al. | |
| 6,331,744 B1 | 12/2001 | Chen et al. | |
| 6,379,182 B1 | 4/2002 | Byrne | |
| 6,586,909 B1 * | 7/2003 | Trepka | 320/108 |
| 6,641,190 B2 * | 11/2003 | Kirchhoff | 296/26.11 |
| 6,803,744 B1 * | 10/2004 | Sabo | 320/108 |
| 6,811,233 B1 * | 11/2004 | Packer | 312/313 |
| 6,975,198 B2 | 12/2005 | Baarman et al. | |
| 7,077,179 B1 | 7/2006 | Camiano et al. | |
| 7,083,421 B1 | 8/2006 | Mori | |
| 7,109,682 B2 | 9/2006 | Takagi et al. | |
| 7,132,918 B2 | 11/2006 | Baarman | |
| 7,164,255 B2 | 1/2007 | Hui | |
| 7,211,986 B1 * | 5/2007 | Flowerdew et al. | 320/108 |
| 7,239,110 B2 | 7/2007 | Cheng et al. | |
| 7,248,017 B2 | 7/2007 | Cheng et al. | |
| 7,262,700 B2 | 8/2007 | Hsu | |
| 7,271,569 B2 | 9/2007 | Oglesbee | |
| 7,375,492 B2 | 5/2008 | Calhoon et al. | |
| 7,375,493 B2 | 5/2008 | Calhoon et al. | |
| 7,378,817 B2 | 5/2008 | Calhoon et al. | |
| 7,405,536 B2 | 7/2008 | Watts | |
| 7,408,324 B2 | 8/2008 | Baarman et al. | |
| 7,522,878 B2 | 4/2009 | Baarman | |
| 2002/0008044 A1 | 1/2002 | Burrus et al. | |
| 2004/0195767 A1 | 10/2004 | Randall | |
| 2005/0007067 A1 | 1/2005 | Baarman et al. | |
| 2005/0140482 A1 | 6/2005 | Cheng et al. | |
| 2005/0156560 A1 | 7/2005 | Shimaoka et al. | |
| 2006/0043927 A1 | 3/2006 | Beart et al. | |
| 2006/0061323 A1 | 3/2006 | Cheng et al. | |
| 2006/0075862 A1 * | 4/2006 | Parks et al. | 83/451 |
| 2006/0100764 A1 | 5/2006 | Adams et al. | |
| 2006/0131193 A1 | 6/2006 | Sherman | |
| 2006/0202665 A1 * | 9/2006 | Hsu | 320/139 |
| 2007/0182367 A1 | 8/2007 | Partovic | |
| 2007/0236174 A1 | 10/2007 | Kaye | |
| 2007/0247005 A1 | 10/2007 | Tetlow | |
| 2007/0279002 A1 | 12/2007 | Partovi | |
| 2008/0129246 A1 | 6/2008 | Morita | |
| 2009/0072782 A1 | 3/2009 | Randall | |
| 2009/0079387 A1 | 3/2009 | Jin et al. | |
| 2009/0153098 A1 | 6/2009 | Toya et al. | |
| 2009/0158971 A1 | 6/2009 | Carter | |
| 2009/0179611 A1 | 7/2009 | Sander et al. | |
| 2009/0212637 A1 | 8/2009 | Baarman et al. | |
| 2009/0212639 A1 | 8/2009 | Johnson | |
| 2010/0038970 A1 | 2/2010 | Cook et al. | |
| 2010/0164298 A1 | 7/2010 | Karalis et al. | |

OTHER PUBLICATIONS

PCT Notification of Transmittal of International Preliminary Report on Patentability, Mail Date: Jan. 11, 2011, PCT/US09/41508, Applicant: L & P Property Management Company, 12 pages.

International Search Report, mailed Jul. 7, 2009 re Appl. No. PCT/US09/41508, (11 pages).

Non-Final Office Action mailed Aug. 19, 2010 re U.S. Appl. No. 12/391,714, filed Feb. 24, 2009, (20 pages).

Non-Final Office Action mailed Aug. 18, 2010 re U.S. Appl. No. 12/391,735, filed Feb. 24, 2009, including Scientific and Technical Information Center, EIC 2800 Search Report (44 pages).

PCT Notification of Transmittal of the International Search Report and the Written Opinion mailed 07_06_2009_re_Appl. No. PCT_US09_41513_ (11 pages).

PCT Notification of Transmittal of International Preliminary Report on Patentability mailed Aug. 13, 2010 re Appl. No. PCT/US09/41513 (56 pages).

PCT Notification of Transmittal of International Search Report and the Written Opinion of the International Searching Authority, or the Declaration mailed Nov. 4, 2010 regarding Appl. No. PCT/US2010/048053.

Final Office Action mailed Feb. 4, 2011 re U.S. Appl. No. 12/391,714, filed Feb. 24, 2009, 12 pages.

Final Office Action mailed Feb. 15, 2011 re U.S. Appl. No. 12/391,735, filed Feb. 24, 2009, 15 pages.

EIC 2800 Search Report provided by the Examiner in U.S. Appl. No. 12/391,735, 18 pages.

Non-final OA mailed Oct. 18, 2011, U.S. Appl. No. 12/391,735, 11 Pages.

Notice of Allowance mailed Apr. 5, 2012, in U.S. Appl. No. 12/391,735, 17 pp.

Non final Office Action mailed Apr. 25, 2012, in U.S. Appl. 12/391,714, 34 pp.

* cited by examiner

INDUCTIVELY COUPLED WORK SURFACES

CROSS-REFERENCE TO RELATED APPLICATIONS

This application claims priority to U.S. provisional applications 61/031,132, filed Feb. 25, 2008, and 61/142,557, filed Jan. 5, 2009, both of which are hereby incorporated by reference.

BACKGROUND

One of the problems associated with the electronic devices so common in today's world is the necessity for the cords and cables associated with the various electronic devices. Rechargeable cordless devices are a common alternative. These devices still require charging and the associated cords and cables to accommodate this charging.

Technology has been developed to address these limitations by providing an inductively coupled power circuit. This circuit dynamically seeks resonance and optimizes power transfer from a primary coil to a secondary device with a secondary coil. This power transfer can occur under multiple, varying load conditions. By using this circuit, the primary supply circuit adapts its operation to match the needs of the secondary devices being supplied with power. The circuit also allows the primary supply circuit to supply power to multiple secondary devices simultaneously.

SUMMARY

Intelligent, inductively coupled power circuits have been developed to transfer power from a source to a device without the need for a wired connection. Primary coils inductively couple power to secondary coils integrated into devices such as laptop computers, PDAs, cell phones, and power tools. Embodiments of the present invention incorporate this technology into home and industrial work surfaces.

Primary coils integrated into work surfaces inductively couple power to secondary coils integrated into devices such as laptop computers, PDAs, cell phones, and power tools. Work surfaces may be home work surfaces such as tables and work benches. Primary coils may also be integrated into industrial work surfaces such as industrial ergonomic work benches. Inductively coupled work surfaces may also be installed in vehicles. The vehicle work surface could be installed in the interior of the vehicle, or a retractable work surface could be installed such that it is accessible from the exterior of the vehicle.

Primary coils of low, medium, and high power can be integrated into work surfaces in any position, number, and combination. Indicators, such as LEDs, on a work surface may show where devices containing secondary coils should be placed to charge.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Embodiments of the present invention are described with specificity herein to meet statutory requirements. However, the description itself is not intended to limit the scope of this patent. Rather, the inventor has contemplated that the claimed subject matter might also be embodied in other ways.

As noted in the background section, technology has been developed that provides an intelligent, inductively coupled power circuit. This circuit dynamically seeks resonance and optimizes power transfer from a primary coil to a secondary device with a secondary coil. The circuit allows the primary coil to determine and provide the power needs of the secondary device. By using this circuit, the primary supply circuit adapts its operation to match the needs of the secondary devices being supplied with power. The circuit also allows the primary supply circuit to supply power to multiple secondary devices simultaneously. Examples of the circuit and the operation of the circuit are contained in the following U.S. Patents, all of which are hereby incorporated by reference: U.S. Pat. Nos. 6,436,299; 6,673,250; 6,731,071; 6,806,649; 6,812,645; 6,831,417; 6,917,163; 6,975,198; 7,116,200; 7,118,240; 7,126,450; and 7,132,918.

Inductively coupled power circuits may be used to power and recharge cordless devices, including cell phones, PDAs, flashlights, laptop computers, and power tools. Each cordless device has a secondary coil. The primary coil required to create the inductively coupled power circuit may be integrated into an industrial or home work surface. Examples of such surfaces with integrated primary coils include a table, a home work bench, an industrial work bench, an ergonomic work bench, an industrial ergonomic workbench, a mobile work surface in a vehicle, a retractable work surface, and a retractable work surface in a vehicle.

Figure 1:
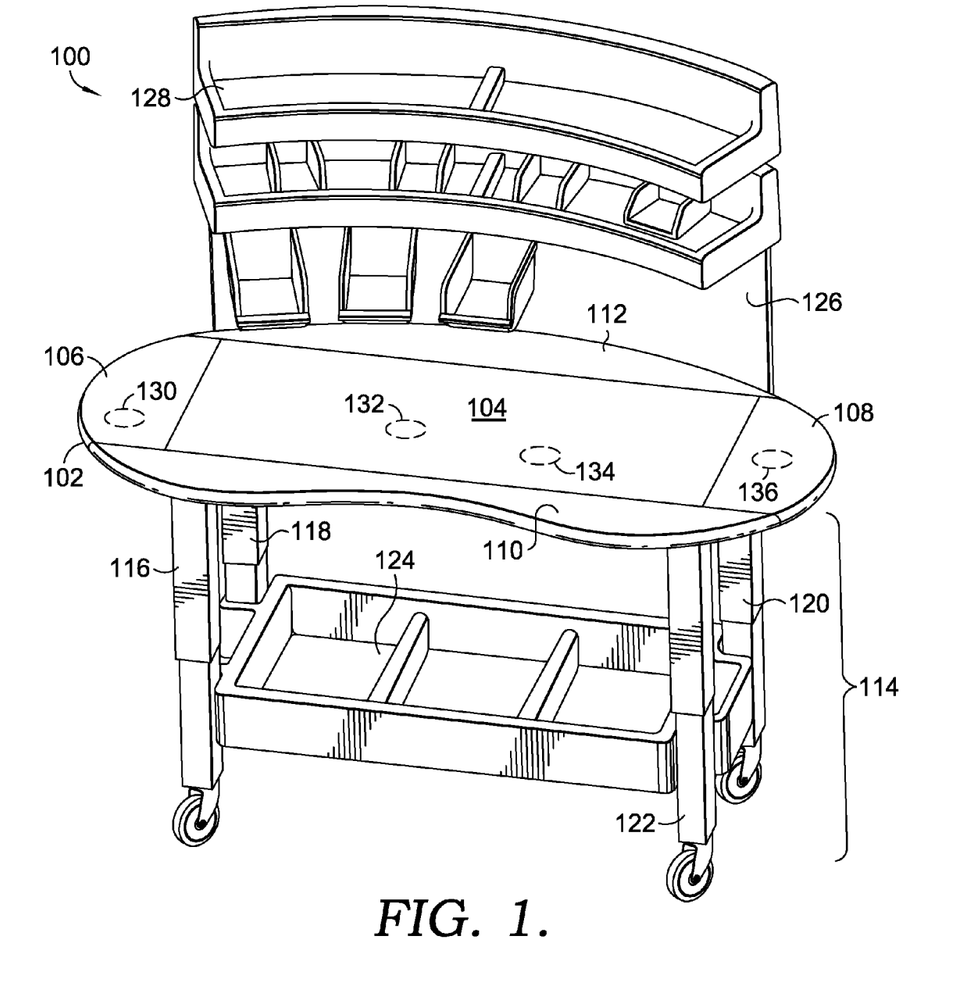
FIG. 1 is a perspective view of an ergonomic work bench.

FIG. 1 illustrates an ergonomic work bench 100. Work surface 102 of work bench 100 comprises central work surface 104, work surface side wings 106 and 108, and work surface front and rear wings 110 and 112. Some embodiments may include, in addition to central work surface 104, only work surface side wing 106, work surface side wing 108, work surface front wing 110, or work surface rear wing 112. Additional embodiments may include all wings or any combination of wings.

With continued reference to FIG. 1, work surface side wings 106 and 108 and work surface front and rear wings 110 and 112 are curved such that they form an ergonomic work surface when attached to central work surface 104. Work surface side wings 106 and 108 and work surface front and rear wings 110 and 112 may be attached to central work surface 104 by screws, bolts, or any other connection mechanism. In one embodiment, work surface side wings 106 and 108 and work surface front and rear wings 110 and 112 are thinner than central work surface 104 but have an extended edge substantially as thick as central work surface 104. This allows the wings to be screwed or bolted through the extended edge into the side of central work surface 104. Other means of connection, such as support beams extending beneath central work surface 104 and work surface side wings 106 and 108 and work surface front and rear wings 110 and 112, are also contemplated.

With continued reference to FIG. 1, work surface 102 is supported by support structure 114. Support structure 114 comprises support members 116, 118, 120, and 122. In some embodiments, support members may be attached to wheels. In other embodiments, support members may terminate in a substantially flat base. Storage tray 124 is attached in the space bounded by support members 116, 118, 120, and 122. In some embodiments, storage tray 124 may be attached or rest on horizontal support members that run between support members 116, 118, 120, and 122. Work station shield 126 may be attached to work surface rear wing 112, central work surface 104, or support structure 114. Storage tray 128 is attached to work station shield 126. Work station shield 126 and storage tray 128 are curved in substantially the same manner as work surface rear wing 112 to create an ergonomic work space. The concavity of the curve brings the furthest portions of work bench 100 nearer to a user than if the concave portions were linear.

Inductively coupled power circuits may be incorporated into a work bench such as work bench 100 of FIG. 1. Integrated primary coils for such power circuits are indicated by coil location indicators 130, 132, 134, and 136. Coil location indicators 130, 132, 134, and 136 do not necessarily indicate coil size or charging area, which depends upon whether a particular primary coil is low, medium, or high power.

Figure 2:
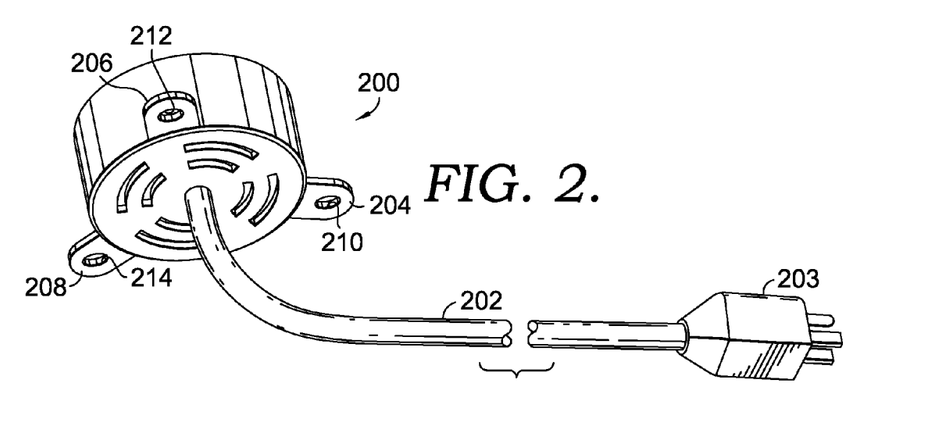
FIG. 2 is a perspective view of an embodiment of a low power primary coil.
Figures 3, 4:
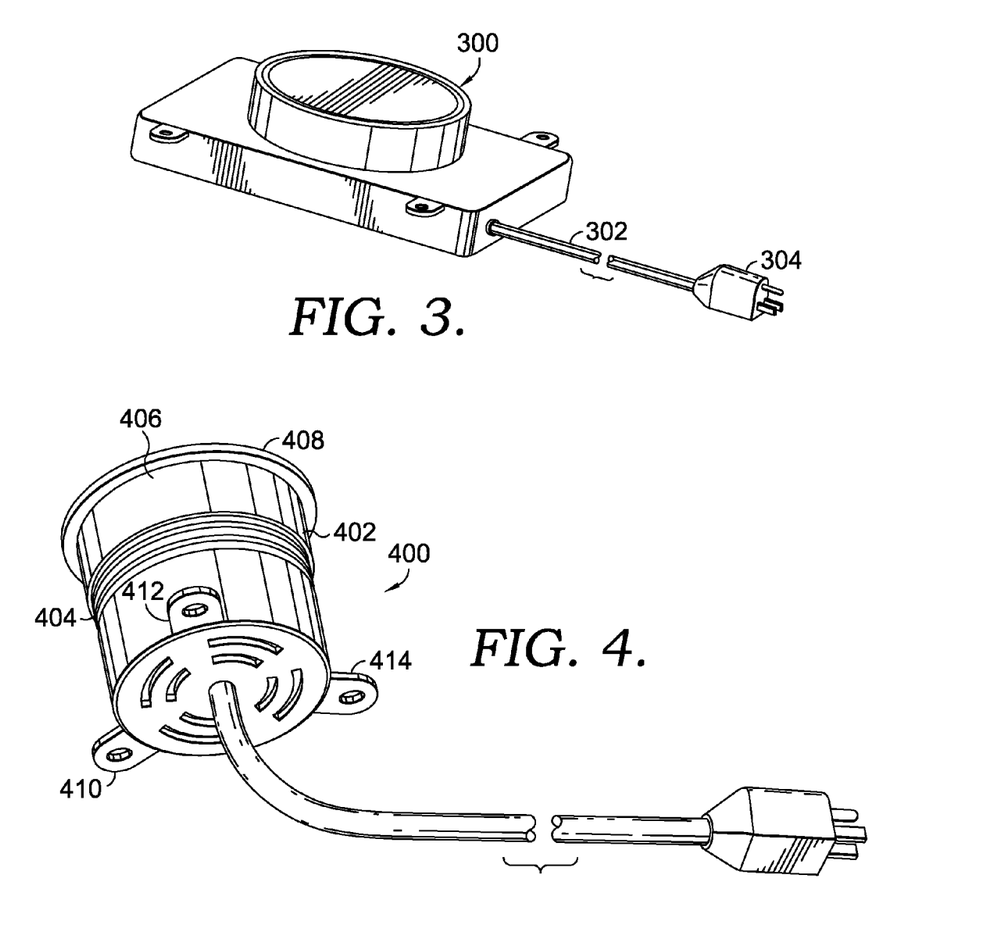
FIG. 3 is a perspective view of an embodiment of a medium power primary coil.
FIG. 4 is a perspective view of an embodiment of a primary coil with an adjustable housing.

FIG. 2-4 illustrate embodiments of primary coils that could be incorporated into a work bench. Primary coils may be designed to provide a low, medium, or high quantity of power. FIG. 2 illustrates a low power primary coil 200. Low power primary coil 200 is designed to provide up to about approximately 20 watts of power transferred through primary coil 200 to a secondary device coil. Low power primary coil 200 is connected to an electrical outlet through power cord 202 and plug 203. Tabs 204, 206, and 208 provide holes 210, 212, and 214, which allow primary coil 200 to be attached to the underside of a work bench via screws, bolts, or other connective methods. In alternative embodiments, low power primary coil 200 is connected to a battery or other power source through power cord 202.

In one embodiment, a cylindrical hole is bored in a work surface, such as central work surface 104 of FIG. 1 or wings 106 or 108, and low power primary coil 200 is attached from underneath the work surface such that the top of low power primary coil 200 is flush with the work surface. Low power primary coil 200 may include a charging indicator. The charging indicator may be an LED or other light source. The charging indicator may also be a ring of LEDs or light sources that substantially trace the outline of low power primary coil 200. The charging indicator is illuminated when a secondary coil in a secondary device draws power from the primary coil. Thus, illumination of the charging indicator occurs when a secondary device is placed on low power primary coil 200 and charges. In other embodiments, a light pipe or electrical connection may be used to place a charging indicator anywhere on the work bench. In further embodiments, the charging indicator may delineate the approximate area within which a secondary device can be placed and be charged through inductive coupling with the particular primary coil.

With continuing reference to FIG. 2, in alternative embodiments, low power primary coil 200 may be inserted into a cavity in the underside of a work surface and attached. In such an embodiment, low power primary coil 200 would not be visible from above the work surface. In still other embodiments, low power primary coil 200 and any indicator lights could be embedded below the work surface and covered with Plexiglas or other transparent material that is level with the work surface. Low power primary coil 200 may be installed at any position on a work surface. For example, with additional reference to FIG. 1, low power primary coil 200 may be installed beneath central work surface 104, work surface side wings 106 and 108, or work surface front and rear wings 110 and 112. Any number of low power primary coils may be installed in a particular work surface.

FIG. 3 illustrates a medium power primary coil 300. Medium power primary coil 300 is designed to provide about approximately between 20 and 100 watts of power transferred from primary coil 300 to a secondary device coil, although more or less power could also be provided. Medium power primary coil 300 is connected to an electrical outlet through power cord 302 and plug 304. In alternative embodiments, low power primary coil 300 is connected to a battery or other power source through power cord 302. Medium power primary coil 300 provides a similar tab-and-hole connection mechanism to low power primary coil 200.

FIG. 4 illustrates a primary coil 400 enclosed in an adjustable housing 402. Base portion 404 of housing 402 is threaded and screws into top portion 406 of housing 402. Top portion 406 can be tightened or loosened to provide more or less distance between lip 408 and attachment tabs 410, 412, and 414. Adjustable housing 402 allows primary coil 400 to be installed in work surfaces having a range of thicknesses. Primary coil 400 would be installed in a cylindrical hole drilled or otherwise made in a work surface. Lip 408 of top portion 406 may be wider than the cylindrical hole and rest on and be slightly higher than the top of the work surface. Alternatively, a work surface may have a depression along the circumference of the cylindrical hole substantially the same depth as the height of lip 408 such that lip 408 fits in the depression and primary coil 400 is substantially even with the top of the work surface.

Figure 5:
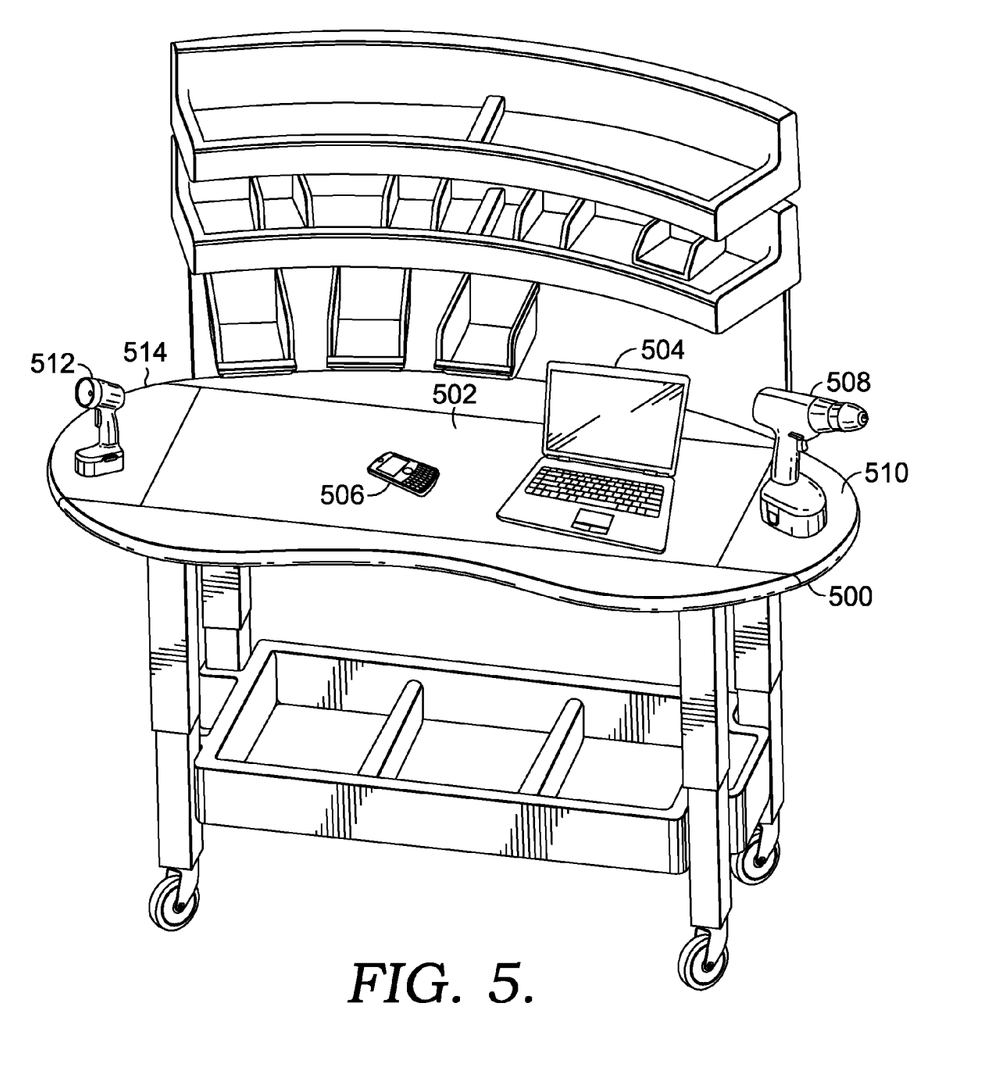
FIG. 5 is a perspective view of a work bench with low and medium power primary coils installed.

FIG. 5 illustrates an ergonomic work bench 500 with low and medium power primary coils installed. A medium and low power primary coil are installed beneath central work surface 502. The medium power primary coil is installed beneath laptop computer 504 such that the coil is not visible from above central work surface 502. Laptop computer 504 charges when placed over the medium power primary coil. A low power primary coil is installed below PDA 506. PDA 506 charges when placed above the low power primary coil. Cordless drill 508 is placed above a second medium power primary coil installed under work surface side wing 510. Cordless drill 508 charges when placed over the second medium power primary coil. Flashlight 512 is placed above a second low power primary coil installed under work surface side wing 514. Flashlight 512 charges when placed over the second low power primary coil. In each location where a primary coil is installed, a recharging zone is created on the top of the work surface. It should be understood that any number of primary coils could be installed, and corresponding recharging zones created, in any position. It should be also be understood that the rechargeable devices shown are merely exemplary, and that a virtually unlimited number and variety of devices could charge through primary coils installed in the work bench, so long as they are provided with a proper secondary coil.

In addition to inductively coupled power circuits being included in newly produced work benches, a kit is contemplated for retrofitting existing work benches and other industrial work surfaces with an inductively coupled power circuit. The kit comprises one or more primary coils, for example low power primary coil 200 in FIG. 2 or medium power primary coil 400 in FIG. 4, means for attaching the coil to a work surface, and installation instructions.

Figure 6:
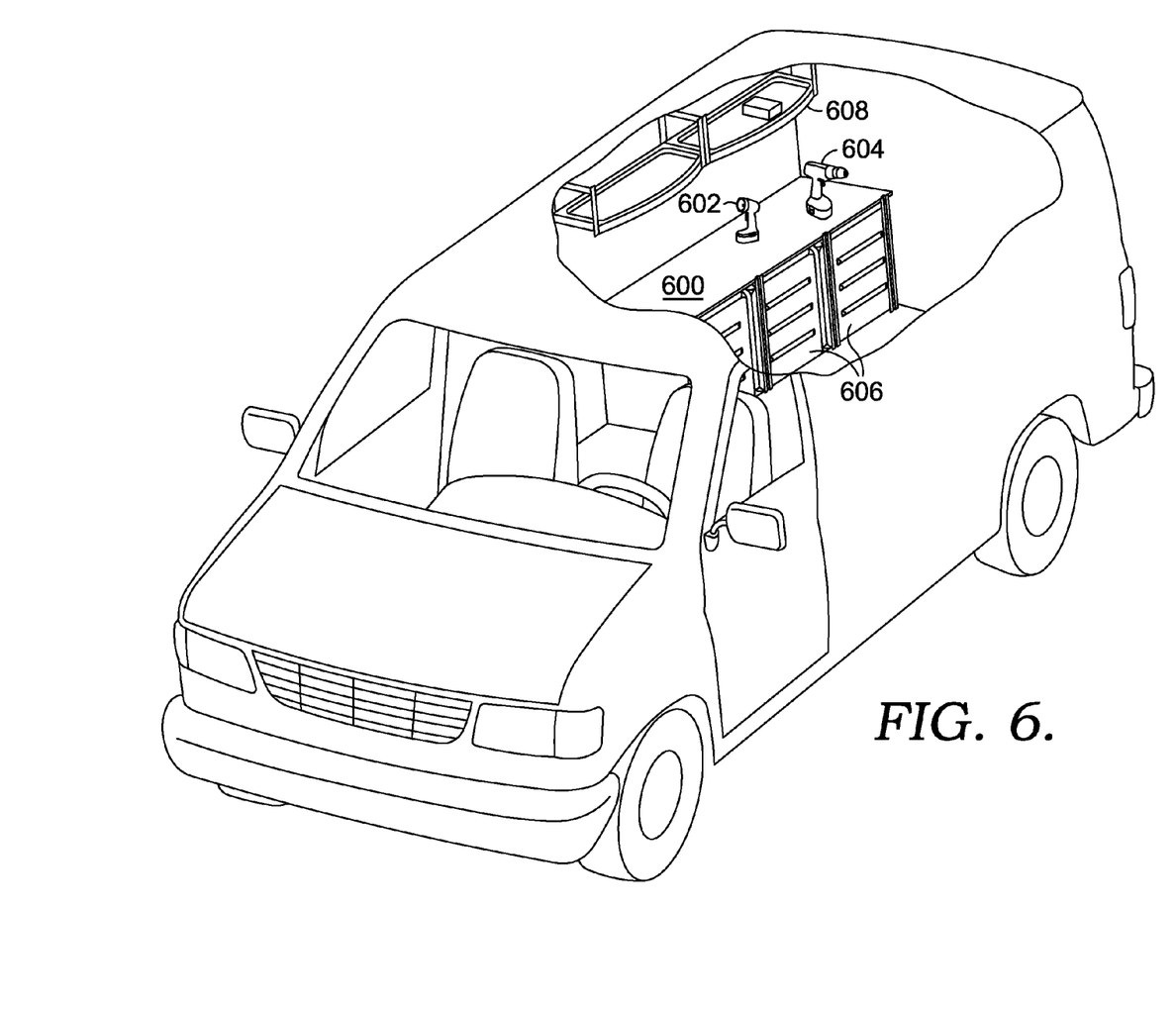
FIG. 6 is a partial perspective view of an inductively coupled work surface installed in a vehicle.
Figures 7, 8, 9:
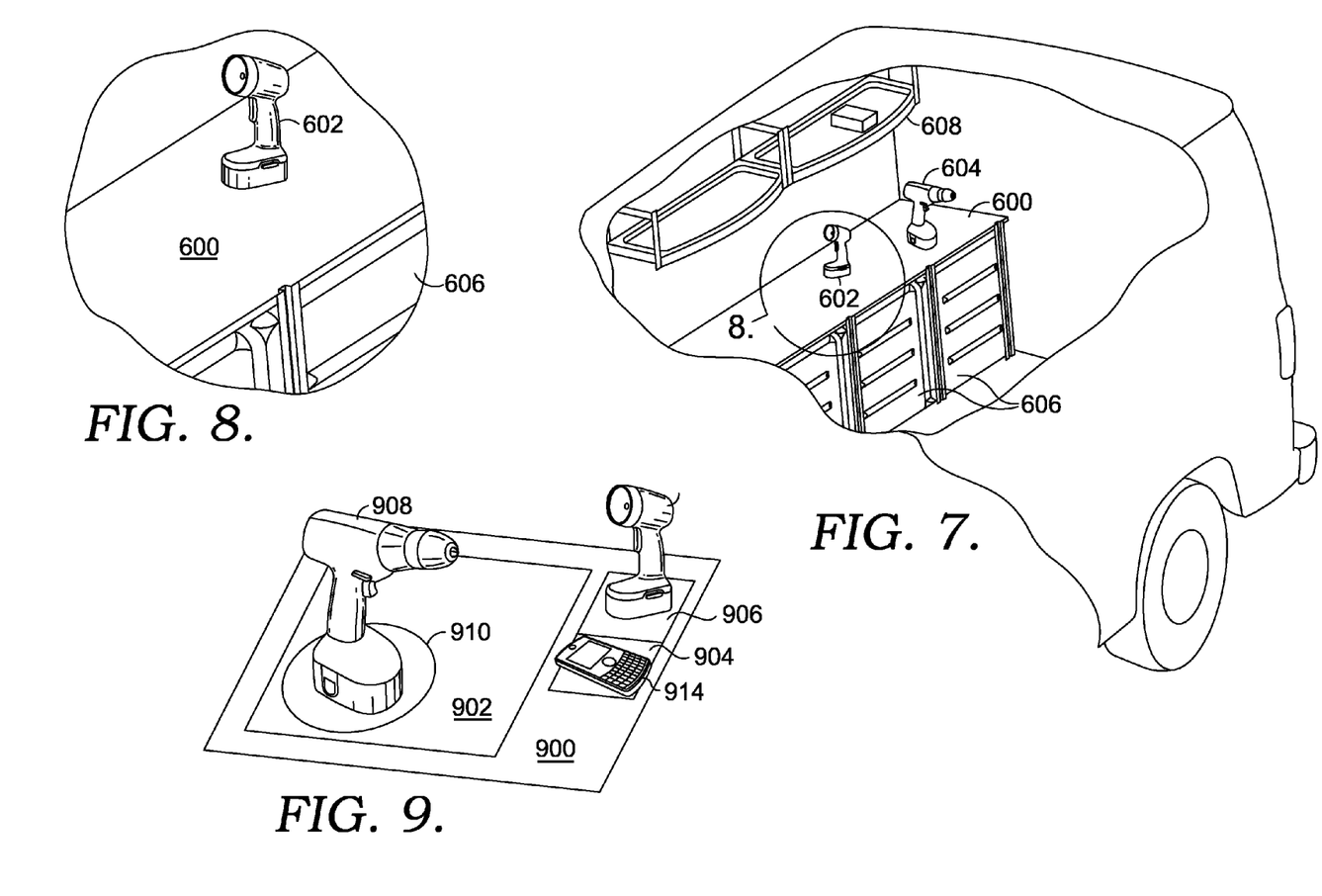
FIG. 7 is a partial perspective view with parts broken away of an inductively coupled work surface installed in a vehicle.
FIG. 8 is an enlarged partial perspective view of a tool containing a secondary coil charging on the inductively coupled work surface of FIG. 7.
FIG. 9 is a perspective view of an inductively coupled work surface charging devices containing secondary coils.

FIG. 6 illustrates an inductively coupled work surface installed in a vehicle. Low, medium, or high power primary coils are integrated into work surface 600. Any combination of primary coils could be used. The primary coils could be powered through batteries, the vehicle engine, or other means. Rechargeable flashlight 602 and cordless drill 604 are shown above primary coils integrated into work surface 600. Work surface 600 may be suspended from the vehicle walls or ceiling, supported from the vehicle floor, or attached to the sides of the vehicle. In one embodiment, the support structure supporting work surface 600 includes storage compartments 606. Shelves 608 may also be installed above work surface 600. Another view of an inductively coupled work surface installed in a vehicle is shown in FIG. 7. FIG. 8 is a detailed illustration of rechargeable flashlight 602, work surface 600, and storage compartments 606.

FIG. 9 illustrates an inductively coupled work surface showing charging areas. Work surface 900 is divided into charging areas 902, 904, and 906. A medium power primary coil is located under charging area 902 and charges cordless drill 908, which contains a secondary coil. Placement indicator 910 may also be included in work surface 900. Placement indicator 910 may be LEDs or other light sources or may be a non-illuminated indicator of where a device containing a secondary coil should be placed for efficient charging. Charging area 902 may indicate the physical extent within which a device containing a secondary coil is able to be charged by the primary coil integrated in work surface 900 beneath charging area 902. Low power primary coils are located beneath charging areas 906 and 904 to charge rechargeable flashlight 912 and PDA 914.

Figure 10:
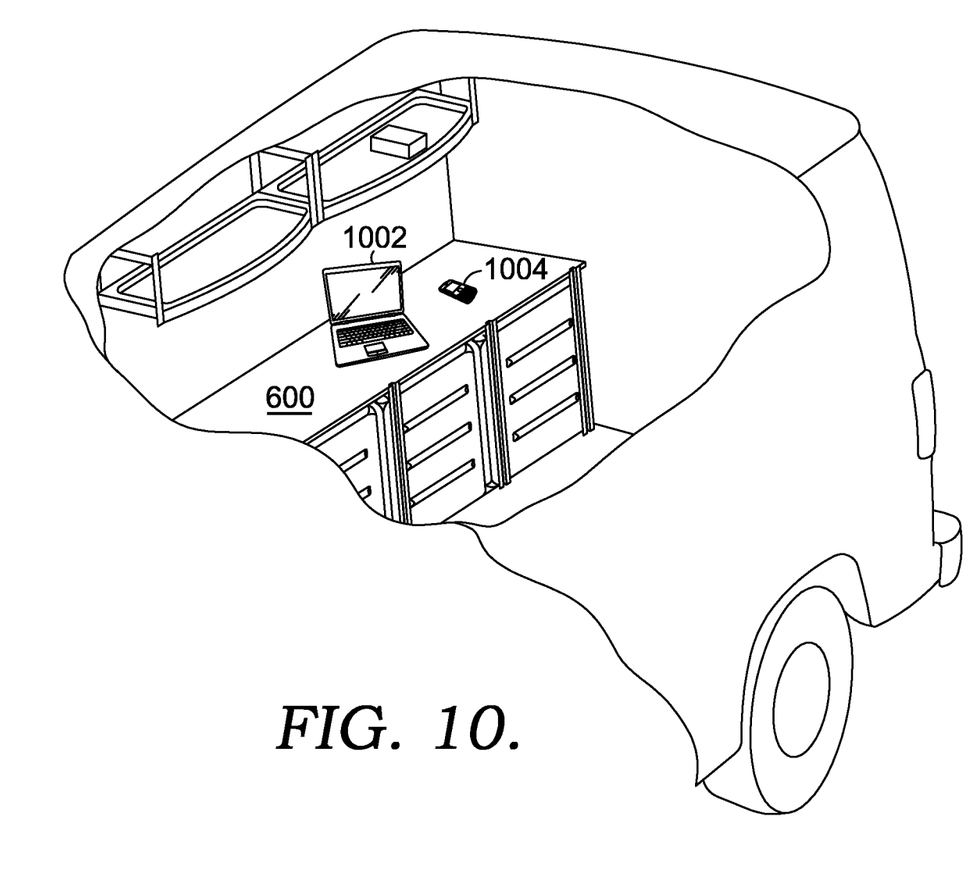
FIG. 10 is a partial perspective view with parts broken away of an inductively coupled work surface installed in a vehicle.

FIG. 10 also illustrates an inductively coupled work surface installed in a vehicle. Laptop computer 1002 and PDA 1004 are charging on primary coils integrated into work surface 600.

Figure 11:
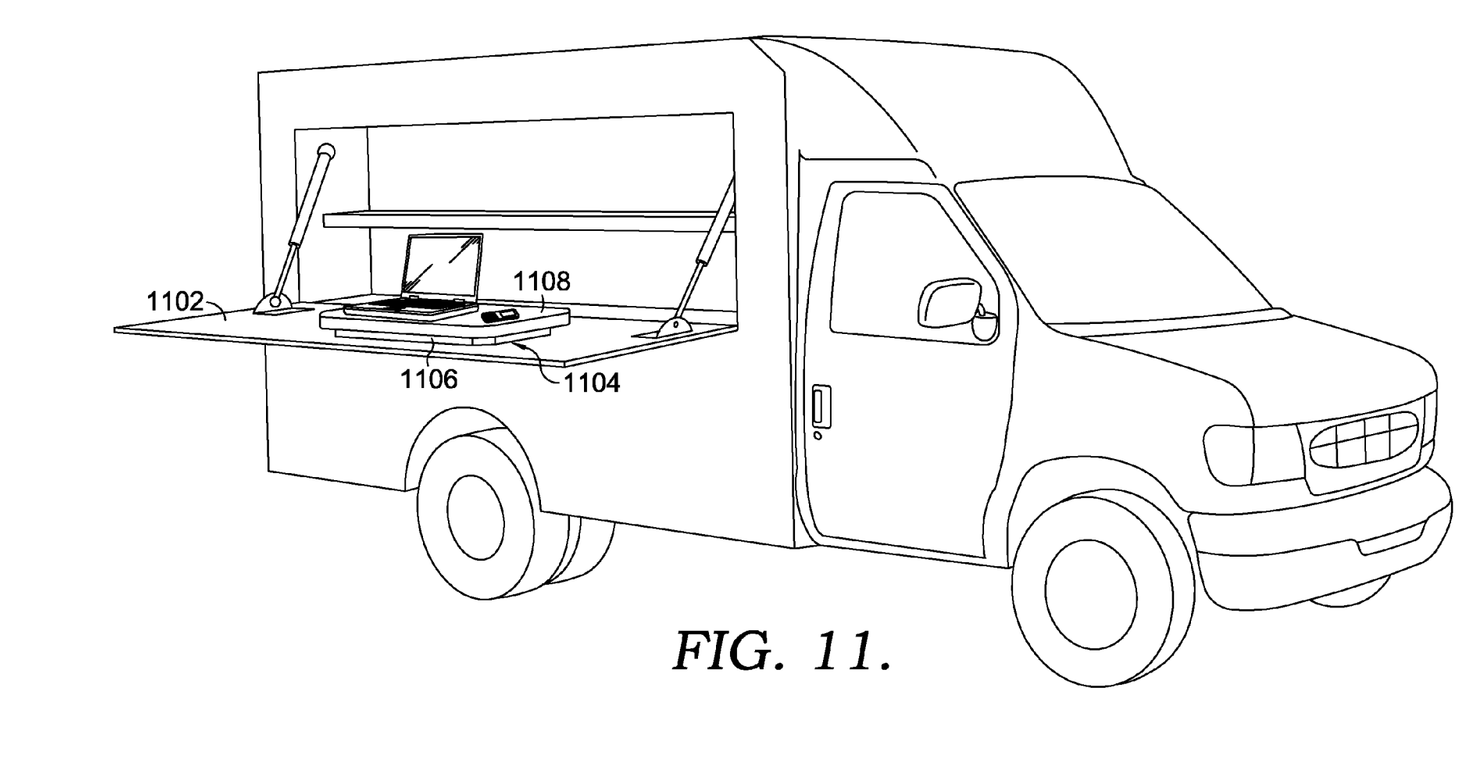
FIG. 11 is a perspective view of a retractable, inductively coupled work surface installed in a vehicle.
Figure 12:
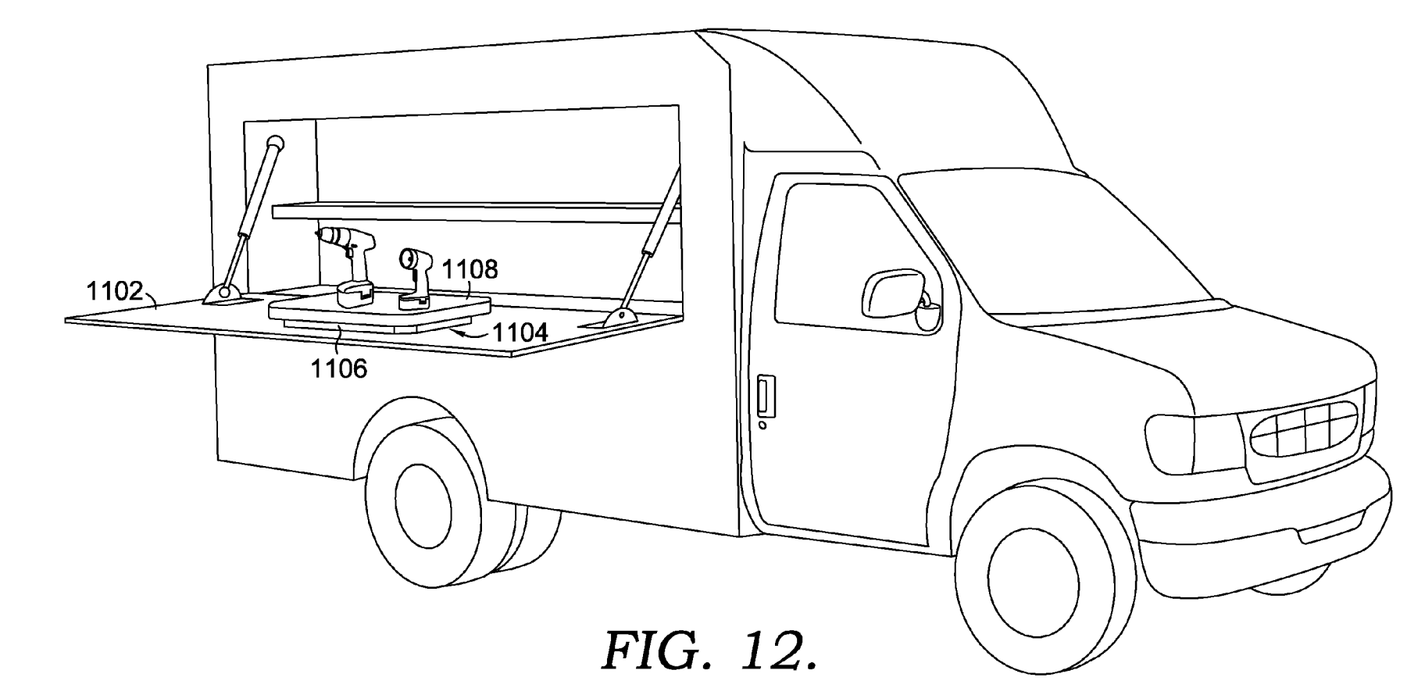
FIG. 12 is a perspective view of a retractable, inductively coupled work surface installed in a vehicle.

Primary coils may also be installed in retractable, inductively coupled work surfaces attached to a structure. The structure may be, but is not limited to, a vehicle, office or building interior or exterior wall, desk, podium, or table. FIGS. 11 and 12 illustrate embodiments where a retractable, inductively coupled work surface is attached to a vehicle and is accessible from the exterior of the vehicle. More specifically, the vehicle is provided with a folding shelf 1102. Shelf 1102 is hingedly coupled to the vehicle along its bottom edge. Stops are provided to support the shelf in a horizontal orientation when fully open. The shelf 1102 can thus be moved from a storage position flush with the side of the vehicle, to an in-use position that provides a horizontal work surface. The shelf has a locking mechanism to hold it in the storage position. Shelf 1102 has a charging station 1104 coupled to it. Station 1104 has a number of primary coils contained within a cover 1106. Station 1104 also has a charging template 1108 located directly over the cover 1106. The template 1108 preferably has charging areas and charging indicators similar to those shown in FIG. 9 for work surface 900. Like interior work surface 900, station 1104 may be equipped with indicator lights adjacent the charging areas that illuminate when a device containing a secondary coil is in place and charging. Station 1104 therefore provides a recharging station with multiple recharging areas on the exterior of the vehicle immediately adjacent an exterior work surface. This allows a user to charge cordless devices (such as the cordless drill, laptop, cell phone and flashlight shown in FIGS. 11 and 12) without having to access the interior of the vehicle.

In embodiments described herein with a plurality of primary coils, a single circuit may control all of the plurality of primary coils.

It should be understood that all implementations of a primary coil installed in a surface described above are contemplated as either newly manufactured items in which one or more primary coils are installed before sale and as a kit in which one or more primary coils may be installed after sale.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. An inductively coupled work surface, comprising:
    an ergonomic work surface having a top surface generally opposed by an underside surface, wherein a hole extends through the underside surface and into the ergonomic work surface;
    a primary coil having a housing and an extension member extending generally perpendicular and radially from the housing, wherein the housing is positioned in the hole beneath the top surface and a fastener attaches the extending member to the underside surface of the ergonomic work surface, and wherein the primary coil is capable of inductively powering a device containing a secondary coil positioned on the top surface; and
    one or more indicators that positioned beneath the top surface to indicate charging of the primary coil, wherein the one or more indicators are covered by, and viewable through, a transparent material that is substantially flush with the top surface.

2. The inductively coupled work surface of claim 1, wherein the primary coil is substantially flush with the top surface.

3. The inductively coupled work surface of claim 1, wherein the primary coil includes a high power primary coil.

4. The inductively coupled work surface of claim 1, wherein the work surface is installed in a vehicle.

5. The inductively coupled work surface of claim 1 further comprising, a plurality of primary coils attached to the ergonomic work surface, wherein the plurality of primary coils is controlled by a single circuit.

6. The inductively coupled work surface of claim 1, further comprising a work station shield extending upwardly from the ergonomic work surface and including a storage tray coupled to the shield, the shield following a curved perimeter of the ergonomic work surface.

7. The inductively coupled work surface of claim 1, wherein the housing includes an adjustable housing that is height adjustable to fit ergonomic work surfaces having a range of thicknesses.

8. A retractable, inductively coupled work surface, comprising:
   a retractable work surface having a first surface generally opposed by a second surface, wherein a hole extends through the second surface and into the retractable work surface, and wherein the retractable work surface is hingedly coupled along an exterior surface of a vehicle and forms a portion of the exterior surface of the vehicle when in a closed position;
   a primary coil having a housing and a tab extending generally perpendicular and radially from the housing, wherein the housing is positioned in the hole beneath the first surface and a fastener attaches the tab to the second surface of the retractable work surface, and wherein the primary coil is capable of inductively powering a device containing a secondary coil is individually adaptable to power needs of the device being powered, and
   one or more indicators that are positioned beneath the top surface to indicate charging of the primary coil, wherein the one or more indicators are covered by, and viewable through, a transparent material that is substantially flush with the top surface.

9. The retractable, inductively coupled work surface of claim 8, further comprising indicators that identify a charging area for the primary coil.

10. The retractable, inductively coupled work surface of claim 8, wherein the work surface hingedly retracts into a storage compartment in the vehicle.

11. A kit for retrofitting a work surface, comprising:
    a side surface extension configured to attach to a side of an existing central work surface, wherein the side surface extension includes a first surface generally opposed by a second surface, wherein a hole extends through the second surface and into the side surface extension;
    a primary coil having a housing and a tab extending generally perpendicular and radially from the housing, wherein the housing is positioned in the hole beneath the first surface and a fastener attaches the tab to the second surface of the side surface extension, and wherein the primary coil is capable of inductively powering a device containing a secondary coil; and
    one or more indicators that are positioned beneath the top surface to indicate charging of the primary coil, wherein the one or or more indicators are covered by, and viewable through, a transparent material that is substantially flush with the top surface.

12. The kit of claim 11, further comprising indicators that show the charging area for each primary coil.

13. The kit of claim 11, wherein a plurality of primary coils is integrated into the existing central work surface, and wherein the plurality of the primary coils is controlled by a single circuit.

14. The kit of claim 11, wherein the housing is includes an adjustable housing that is height adjustable to fit a variety of side surface extensions having a range of thicknesses.

15. The kit of claim 11, wherein the existing central work surface is attached to a surface in the interior of a vehicle.

16. The kit of claim 11 further comprising:
    an ergonomic front surface extension configured to attach to a front edge of the existing central work surface and with a perimeter curving inwardly toward the central work surface, the ergonomic front surface extension being coplanar with the existing work surface when attached to the existing central work surface; and
    an ergonomic rear surface extension configured to attach to a rear edge of the existing central work surface and with a perimeter curving outwardly from the central work surface in a similar arc to that of the front surface extension such that points along the perimeter of the rear surface extension are in equal reach of a user positioned at a center of the front surface extension, the ergonomic rear surface extension being coplanar with the existing central work surface when attached to the existing central work surface.

17. The kit of claim 16, further comprising a work station shield extending upwardly from the perimeter of the rear surface extension and including a storage tray coupled to the shield, the shield following the curved perimeter of the rear surface extension such that- the storage tray coupled thereto is directed toward the center of the front surface extension.

\* \* \* \* \*